Nov. 6, 1923.  1,473,201
C. ANDRADE, JR
DIFFERENTIAL
Filed Nov. 17, 1922  3 Sheets-Sheet 1

INVENTOR.
Cipriano Andrade Jr.

Witness
Guy W. Hodges
Eleanor Haight

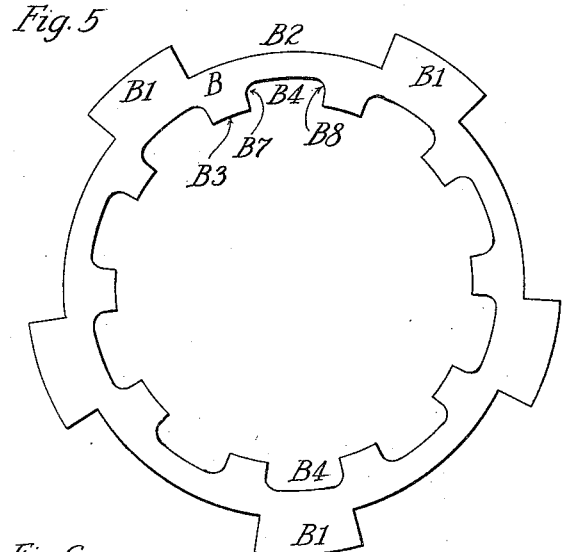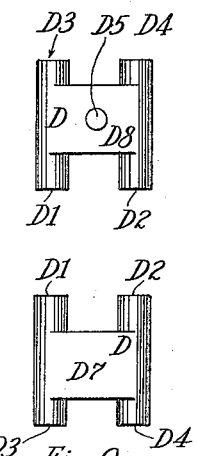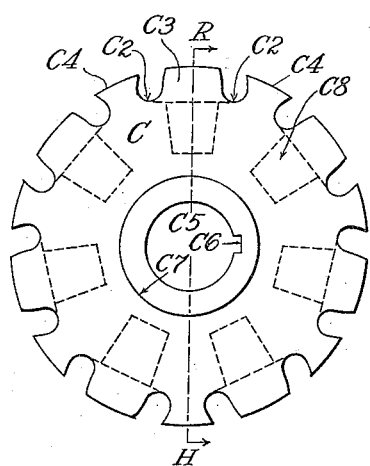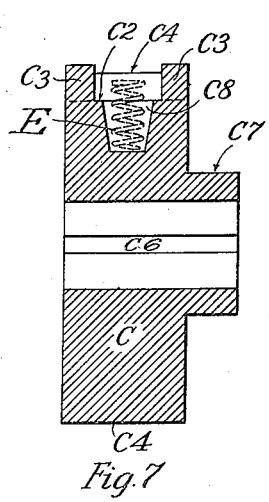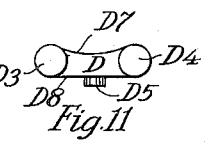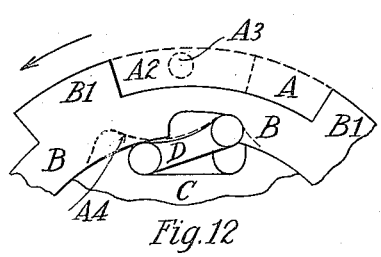

Patented Nov. 6, 1923.

1,473,201

UNITED STATES PATENT OFFICE.

CIPRIANO ANDRADE, JR., OF NEW YORK, N. Y.

DIFFERENTIAL.

Application filed November 17, 1922. Serial No. 601,451.

*To all whom it may concern:*

Be it known that I, CIPRIANO ANDRADE, Jr., a citizen of the United States, residing at New York, in the county of New York and State of New York, have invented a new and useful Differential, of which the following is a specification.

My invention relates to differentials. The general function of my present device is fully described in my previous applications Serial No. 584,346 filed August 25, 1922, Serial No. 585,843 filed September 2, 1922, and Serial No. 597,707 filed October 30, 1922, and the object of my invention is, to provide a differential with a locking member other than a roller, and to provide new arrangements of the driving member, control member, locking members and driven members.

I attain these objects by the mechanism illustrated in the accompanying drawings, in which—

Figure 1:
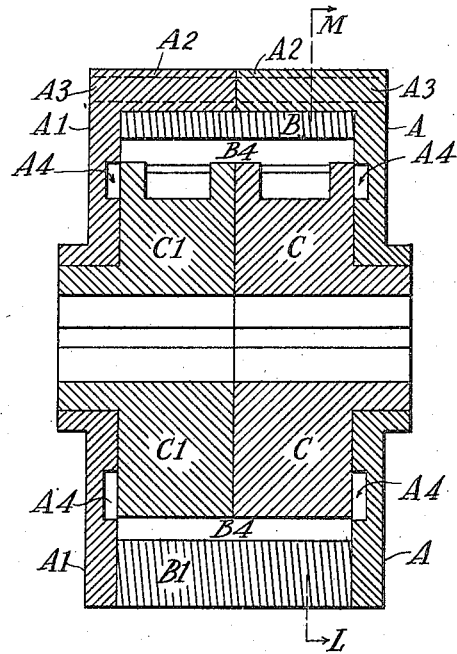
Figure 2:
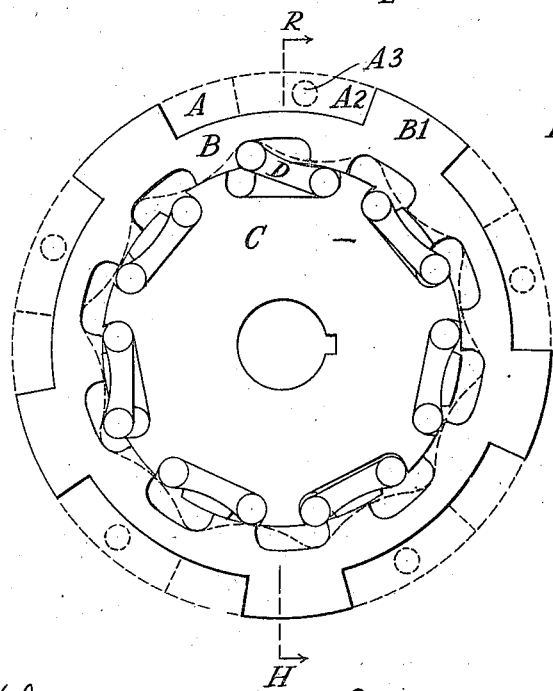
Figure 3:
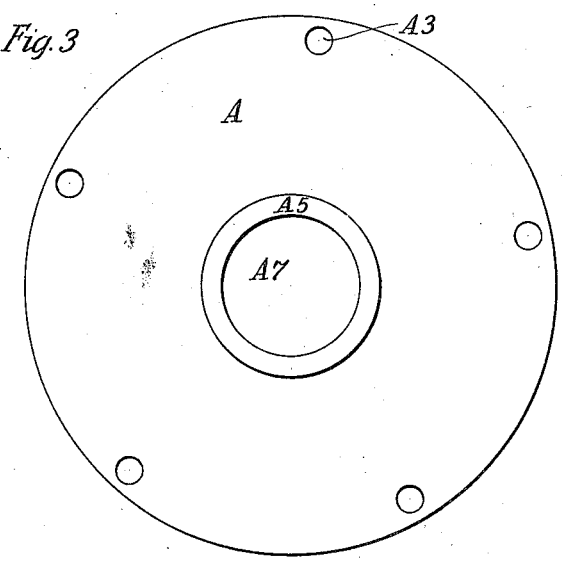
Figure 4:
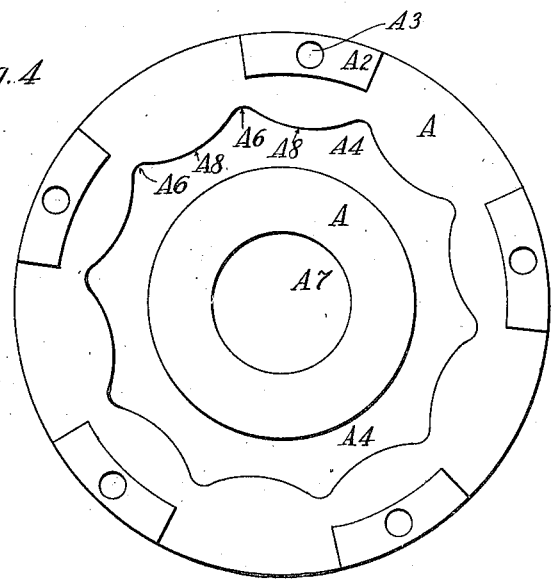

Fig. 1 is a longitudinal section elevation of parts of my device on the line R H of Fig. 2; Fig. 2 is an inside end view of a transverse section elevation of my device, taken on the line M L of Fig. 1, in order to facilitate the identification of the members, the usual section lining has been omitted, and the parts of member A which are shown in Fig. 2 are in dotted lines; Fig. 3 is an outside end view of primary driving member A; Fig. 4 is an inside end view of primary driving member A; Fig. 5 is an end view of secondary driving member B; Fig. 6 is an outside end view of driven member C; Fig. 7 is a longitudinal section elevation of driven member C taken on the line R H of Fig. 2; Fig. 8 is a plan view of part of the top of driven member C; Fig. 9 is a plan view of the outer face of locking member D; Fig. 10 is a plan view of the inner face of locking member D; Fig. 11 is a longitudinal elevation of locking member D; and Fig. 12 is a diagrammatic end view of part of my device when driving member A is rotating anticlockwise, or opposite the direction shown in Fig. 2.

Similar letters refer to similar parts throughout the several views.

A and $A^1$ together form the primary driving member, they are identical in all respects. A and $A^1$ are held together by bolts which pass through holes $A^3$ in lugs $A^2$ and are fastened by nuts, thus locking A and $A^1$ together so as to prevent any relative motion whatever between A and $A^1$. A and $A^1$ have control recesses $A^4$, whose outer surfaces are so shaped that the points $A^8$ register with the circumference of driven members C and $C^1$, and points $A^6$ register with the top of recesses $B^4$. $A^7$ is an opening to admit the ends $C^7$ of driven members C and $C^1$.

Secondary driving member B has lugs $B^1$ which engage with lugs $A^2$ and allow limited relative circumferential motion between members $AA^1$ and B. Member B also has transverse openings $B^4$ whose ends $B^7$ and $B^8$ hold the ends of locking members D. $B^2$ are recesses between lugs $B^1$, which recesses hold the lugs $A^2$ of A and $A^1$. $B^3$ is the inner bearing surface of member B in contact with driven members C and $C^1$. C and $C^1$ are the driven members, with outer bearing surfaces $C^4$, side struts $C^3$, recesses $C^2$, and holes $C^8$ to accommodate spiral springs E. $C^5$ is the shaft hole with keyway $C^6$.

D are locking members, being double ended pawls, with lugs $D^1$ and $D^2$ which engage in control space $A^4$ and also engage with struts $C^3$. Lugs $D^3$ and $D^4$ are on the inner side of locking members D and engage only with struts $C^3$. $D^7$ is the outer face of locking member D, and $D^8$ is the inner face of locking member D. $D^5$ is a stud on the inner face $D^8$ of locking member D, and is designed to enter the spiral spring E which is indicated in dotted lines in Fig. 7.

The operation of my device is as follows:

Let us assume that primary driving member $AA^1$ is moving clockwise as shown by the arrow under the letter R in Fig. 2. Lug $A^2$ will then be in contact with lug $B^1$, and secondary driving member B will likewise rotate clockwise, and control recess $A^4$ will be in such relation to recesses $B^4$, that pawls D enter ends $B^7$ of recesses $B^4$, and thereupon driven members C and $C^1$ will rotate clockwise with members $AA^1$ and B. If either driven member C or $C^1$ is externally actuated to rotate clockwise differentially more rapidly than $AA^1$ and B, it is obvious from an inspection of Fig. 2, that pawls D will permit such differential motion.

Let us assume, now, that primary driving member $AA^1$ starts to rotate anticlockwise as indicated in Fig. 12 by the arrow outside the periphery of $B^1$. Then lug $A^2$ will come in contact with lug $B^1$, and secondary driving member B will likewise rotate anticlockwise, and control recess $A^4$ will be in such relation to recesses $B^4$, that pawls D enter ends B³ of recesses B⁴, and thereupon driven members C and C¹ will rotate anti-clockwise with members AA¹ and B; and control recess A⁴ will likewise permit anti-clockwise circumferential motion of driven members C or C¹ with relation to AA¹ and B.

The details of this differential motion have been fully shown and described in my three previous applications above cited, and need not be repeated here.

It will be observed that in the differential shown in the drawings there are seven pawls D equally spaced in each of the driven members C and C¹, and that there are ten recesses B⁴ equally spaced in the member B. The result is that members AA¹ and B can rotate only one seventieth of a circle or five and one seventh degrees before coming into locking contact with driven member C or with driven member C¹. The advantage of this is that it minimize the lost motion circumferentially between the driving members (AA¹ and B) and the driven members (C and C¹); but the disadvantage of this arrangement is that it throws the entire strain of each driven member on only one pawl.

If, on the other hand, we should have the seven pawls D on each of the driven members C and C¹, and should provide only seven equally spaced recesses B⁴ in member B; we would have all seven pawls of each driven member locking at once, thereby distributing and equalizing the strain, but there would be a lost motion circumferentially of 51⅜ degrees between the locking positions of members AA¹ and B with members C or C¹, or ten times the lost motion of the device as shown in the drawings.

I claim:

In a differential; a primary driving member having control recesses to actuate the control lugs on the pawls hereinafter mentioned; a secondary driving member actuated by said primary driving member and capable of limited circumferential motion in relation thereto, said secondary driving member having recesses in its inner face adapted to engage either in forward or reverse direction the pawls hereinafter mentioned; a first driven member inside of said secondary driving member, said first driven member containing recesses adapted to hold the pawls hereinafter mentioned and to engage said pawls either in forward or reverse direction; a second driven member inside of said secondary driving member, said second driven member containing recesses adapted to hold the pawls hereinafter mentioned and to engage said pawls either in forward or reverse direction; a plurality of double ended pawls enclosed in the recesses in each of said driven members, said pawls having control lugs which engage in the control recesses in said primary driving member, whereby said pawls perform a locking differential function between said secondary driving member and said two driven members either in forward or reverse direction.

CIPRIANO ANDRADE, Jr.

Witnesses:
ELEANOR HAIGHT,
P. J. SHIELDS.